April 16, 1968 W. C. SANDOR 3,378,299
AUTOMOBILE SEATING CONSTRUCTION
Filed July 5, 1966 2 Sheets-Sheet 1
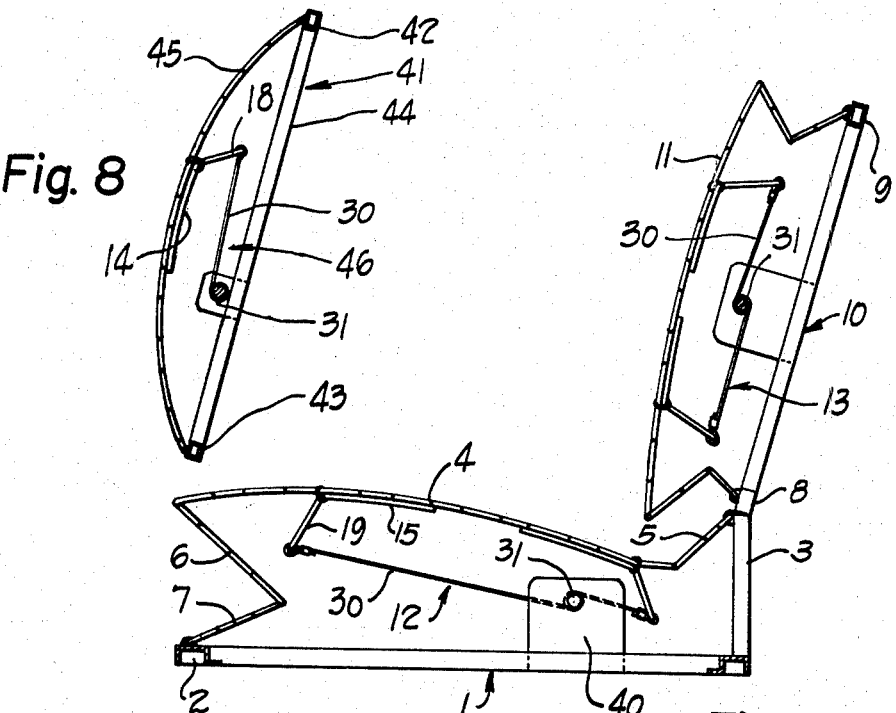
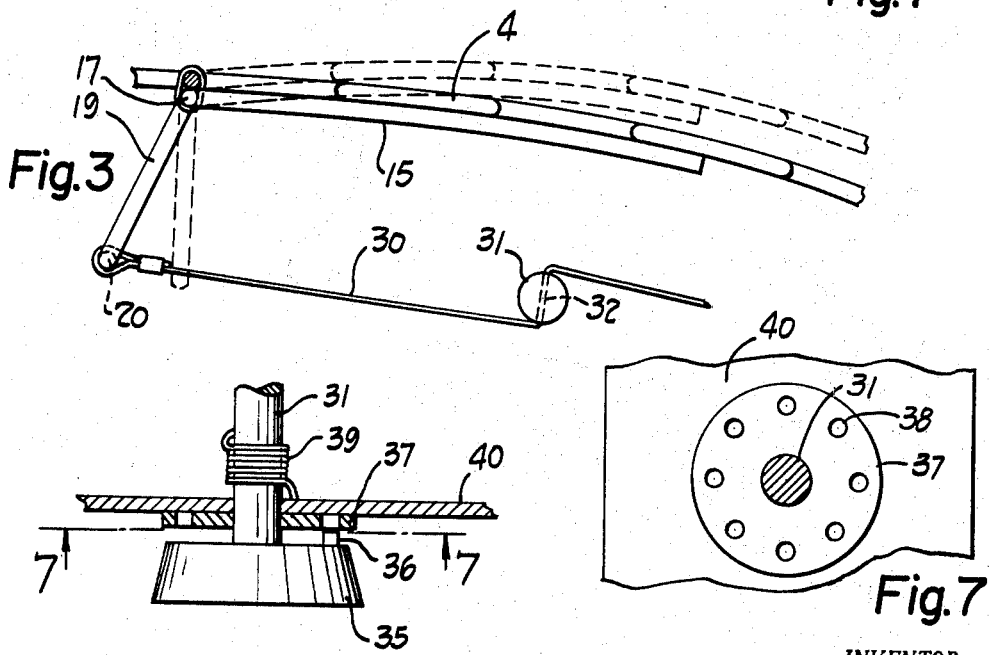
INVENTOR.
W. C. SANDOR
BY Robb+Robb
attorneys April 16, 1968  W. C. SANDOR  3,378,299
AUTOMOBILE SEATING CONSTRUCTION
Filed July 5, 1966  2 Sheets-Sheet 2

INVENTOR.
W. C. SANDOR
BY Robb & Robb
ATTORNEYS

United States Patent Office 3,378,299
Patented Apr. 16, 1968

3,378,299
AUTOMOBILE SEATING CONSTRUCTION
William C. Sandor, 8294 Chagrin Mill Road,
Novelty, Ohio 44072
Filed July 5, 1966, Ser. No. 562,762
7 Claims. (Cl. 297—284)

ABSTRACT OF THE DISCLOSURE

This invention is directed primarily to automotive seat construction and incorporates therein means to adjust the seat portion of said automotive seat construction to support or change the support thereof for varying conditions and in accordance with the weight of the person seated thereon, or to make the seat less resilient relatively as the occasion may demand with adjustable means readily at hand to effect said adjustment. In addition, the invention contemplates the provision of a combination seat structure in which the back is of substantially the same construction as the seat and is likewise adapted to have the tension thereon changed in such a manner as to vary the support provided thereby, suitable instrumentalities being available to effect the adjustment readily to make the same stiffer in the same manner comparable to that of the seat, both being independently preferably arranged.

---

This invention relates to seat construction and more particularly to such construction as is most suited for use in automotive applications the concept being particularly directed to the construction of a seat in which the resiliency of the seat may be regulated as by providing certain tension instrumentalities which are adjustable over a wide range of support from very soft to very firm.

In addition the concept herein is suitable for use not only in the seat portion of an automotive or other type of seat construction but likewise is susceptible of being incorporated in the back portion of such a seat, with independent adjustment of both portions or both the back and seat being easily effected.

One of the particular advantages of providing for adjustment of the firmness or softness of a seat and back construction as in automotive applications, is that by changing the amount of such softness or hardness as the case may be, certain definite safety improvement is provided since the support for the person sitting in the seat is adapted to be changed over a wide range and thus prevent the seat from becoming too hard or too soft during the course of operation of the vehicle so that adequate support is provided and the ability to change the resiliency in effect will similarly change the attitude of the person using the same.

In view of the foregoing it is a particular object of this invention to provide in automotive seating construction, a novel arrangement of elements which facilitate adjustment of the seat and back portions of the seat construction so that changes in the amount of support may be provided thereby or perhaps more accuratley, in the manner in which the support is provided in varying degrees from a very hard combination to a very soft combination and many positions therebetween.

Another object of the invention is to provide mechanism which can be adapted to almost any kind of seat construction in which what may be termed flat springs are used and the manner of adjustment as well as the location of such adjustment is possible of wide variation so as to take advantage of the best support for the operator or passenger in an automobile or the like.

Other and further advantages of the invention will be understood from a consideration of the specification appended hereto and disclosed in the drawings wherein:

FIGURE 1 is a side elevation view in section and largely illustrative, to indicate a particular type of seat construction in which the mechanism hereof is incorporated.

FIGURE 3 is an enlarged fragmentary side view in section showing in detail the manner in which the mechanism operates.

FIGURE 6 is a detailed view somewhat fragmentary in nature showing one form of a portion of the tension instrumentalities showing certain details thereof.

FIGURE 7 is a fragmentary view taken about on the line 7—7 of FIGURE 6 looking in the direction of the arrows.

FIGURE 8 is a fragmentary view in end elevation of a modified form of back for a seat unit.

Figure 2:
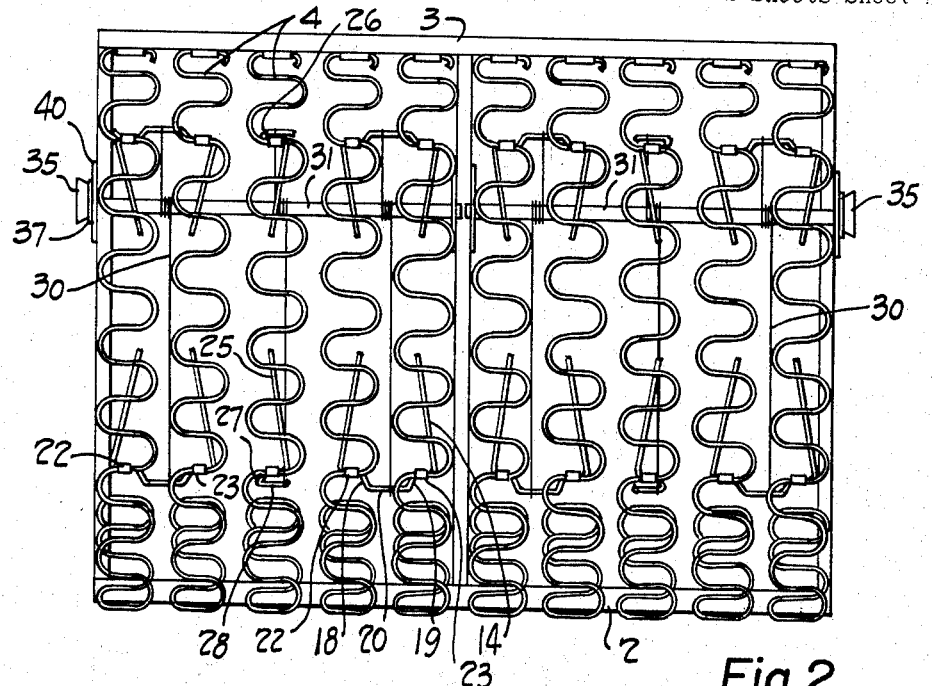
FIGURE 2 is a top view of the seat portion of a seat unit such as illustrated in FIGURE 1.

Referring now to FIGURE 1, the typical seat construction in which this invention is incorporated, is shown as respects the seat portion thereof, to inclue a frame 1 which for purposes hereof may be considered as being generally elongated and rectilinear in plan as suggested in FIGURE 2, having the front member 2 and rear member 3 suitably connected thereto by side members.

Extending from the front longitudinal member 2 rearwardly, being connected in any suitable manner to the members are a series of springs comprising spring means which springs are parallel and as illustrated of a flat, sinuous construction suitably formed as viewed in elevation, so that they provide an arched central section generally indicated at 4 with upwardly extending rear fastening portion 5 connected to the rear longitudinal member 3 in each case.

At the front of each member, the same may be formed with a fish-mouth arrangement as indicated by the inwardly extending portion 6 and the outwardly extending section 7 which latter provides for the fastening of each spring unit at its extremity to the front longitudinal member 2.

As will be understood from FIGURE 2, these spring members are in each case arranged generally in parallelism and suitably treated so as to provide resiliency and in combination the necessary support for a person positioned thereon and thereabove.

As seen in FIGURE 1, the back of the seat unit is comprised of a similar generally rectilinear frame having a longitudinal member 8 at the lower portion thereof as viewed in said figure and an upper longitudinal member 9 connected by side members such as 10 to form the generally rectangular frame, to which are suitably fastened a series of springs such as 11, which are of identical type to the springs 4 but of somewhat different lengths and proportions.

The padding and covering for the seat construction illustrated is not shown at all since it may be of generally conventional configuration and made of materials which are well known, none of which in themselves form a part of this invention. It will be understood, however, the covering and padding is intended to be provided and suitably fastened to the springs and frame in accordance with known seat construction.

It is also understood that the frames 1 and 10 may be of any other form than those illustrated, those being shown as primarily simple members for illustration purposes and obviously adapted to be differently formed for particular applications.

In any event the important phases of this invention are now to be described in that they reside in the actual manner of providing for tensioning of the springs 4 and 11 by provision of certain tension instrumentalities which are generally designated at 12 for those in the seat and at 13 for those in the back.

Figure 4:
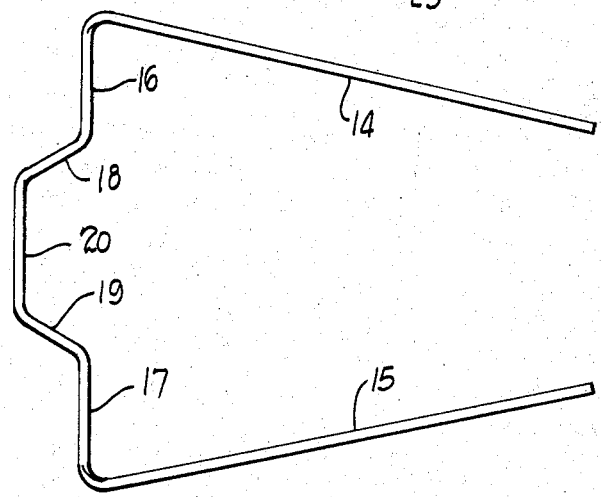
FIGURE 4 is a top view of one of the lever members which may be termed a double lever member which is provided in pairs in the construction preferably.
Figure 5:
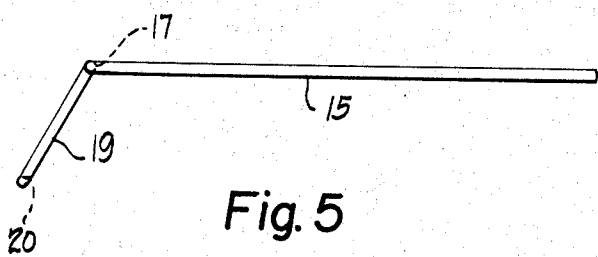
FIGURE 5 is a side view of the lever member as shown in FIGURE 4.

As will be seen in FIGURES 4 and 5, certain lever members are provided, those in FIGURE 4 having a pair of arm members 14 and 15 extending from a pivot portion 16 and 17 respectively, the pivot portion in turn being in connection with the leg 18 and 19 for each pivot portion and the legs 18 and 19 being joined by the part 20.

The lever member illustrated in FIGURE 4 is thus a symmetrical part and adapted to be used in pairs in the spring construction and in this case the seat thereof, as indicated in FIGURE 2, by fastening the pivot portions 16 and 17 by means of clips such as 22 and 23 respectively with the legs of each of these pairs as suggested in FIGURE 1, extending divergently and the free ends of the arms 14 and 15 extending toward one another and spaced any preferred distance according to the amount of support desired to be provided.

As suggested in FIGURE 1, the lever members will be spaced sufficiently and fixed for the movement below the springs with which they are associated for operation in a manner to be subsequently described.

Since it is desired to provide in this particular type of seat illustrated, which for purposes of description will be denoted as a bench type of seat, provisions for adjustment of each half of the seat thereof independently of the other. A group of the springs 4, in this case five in number, are suggested for use, the double lever members shown in FIGURE 4 being used on the outermost pairs of springs and since five springs are called for, a half lever member so to speak is used in the intermediate spring. Each half lever member includes an arm 25, a pivot portion 26, leg portion 27, and a part 28 corresponding to the part 20 of the lever member shown in FIGURE 4.

These half lever members shown will be provided in pairs likewise and of the opposite hand so to speak as suggested in FIGURE 2.

Since it is desired to provide for rotation of the arms for each of the lever members simultaneously, and because of the diverging arrangement of the legs such as legs 18 and 19, a suitable tensioning arrangement is shown. This includes a cable 30 connected at one end by suitable clip members to the part 20 of the forward lever member so to speak and to the corresponding part 20 of the rearward lever member with the cable wound partly around a winding shaft 31 in each case as by extending the cable through an opening such as 32 in the said winding shaft 31.

Since all of the cables 30 will be similarly arranged, it is noted that the winding shaft 31 will be supported thereby and upon rotation cause the lever members to rotate about the pivots 16 and 17 for the double lever members and 26 for the half or single lever members drawing the legs thereof toward one another and causing increased tension to be imparted through the arms to the springs engaged thereby. It should be noted of course that the springs and lever members here described are of suitably tempered wire material and thus resilient inherently so that by drawing on the cables 30 by winding the same around the shaft 31, in effect not only are the lever members rotated as described to provide additional supporting tension to the springs with which they are associated, but in addition the cable 30 also prevents the individual coils of the springs 4 from sagging, thus in effect increasing the support provided by the springs in addition to that provided by the lever members as indicated.

The winding shaft 31 may be provided with any suitable form of knob such as 35 at one extremity thereof the knob 35 in turn having a suitable detent member 36 extending inwardly therefrom for engagement with a disc 37 in which a series of openings 38 are provided, so that the detent 36 may engage said openings to maintain the wound position of the winding shaft 31. A spring 39 located on the shaft 31 and operating against a member such as 40 which may be part of or extend from the frame 1. This will enable the knob to be drawn outwardly, rotated, and positioned by moving inwardly so that the detent 36 engages in opening 38 in the desired selected tensioned position to maintain the tension directed to the lever member as heretofore described.

Other forms of members to rotate the winding shaft 31 might be adopted so that suitable adjustment can be effected and maintained for the winding shaft in its various rotated positions, all within the contemplation of this invention.

The opposite half of the seat, will be similarly arranged with identical winding shaft 31, and a knob 35 at the end thereof, the shaft in turn being connected by the cables 30 to the respective pairs of lever members, all to the end of providing for separate adjustment of the opposite halves of a seat. This will of course facilitate adjustment for the passenger and driver if this be a front seat for example or if the seat be for other purposes, there being sufficient area to support an individual above each of the winding shafts 31 and a suitable area covered by the spring 4 for this purpose in each case.

The back of the seat construction herein described will be substantially identically arranged with the tensioning instrumentalities 13 being formed of identical lever members as shown in FIGURE 4 and half lever members intermediate the pairs of double lever members so to speak, so that each half of the back may be similarly adjusted by manipulation of a suitable knob 35 and winding shaft 31 connected thereto.

It will thus be apparent that a wide range of adjustment may be afforded, with the seat and back in each case and of each half thereof separately adjustable in a large number of increments so that the comfort of each individual supported thereby may be most suitably adjusted in accordance with the contemplation hereof.

It will be understood that the adjusting provisions are such that the different weights of persons supported by the seat construction may be taken into consideration and adjustment made accordingly. Some individuals may wish more and firmer support for the back and thus may likewise effect adjustment as desired all very simply and uniquely arranged to incorporate the same into the seat constructions of all types of vehicles which may use springs of the general nature herein disclosed as part of the construction thereof.

FIGURE 8 discloses a modified form of back which is somewhat simpler in construction, comprising a frame 41 including upper and lower longitudinal members 42 and 43, and vertical parts 44.

In this form, the springs 45 are of the same configuration, but connected at opposite ends, directly to the members 42 and 43.

The tensioning instrumentalities 46 include what may be described as halves of the pairs shown in FIGURE 1 at 13, in this instance, the upper halves, including lever members, and half lever members as shown in FIGURES 2 and 4. Likewise a winding shaft 31 is provided to wind a cable 30 using control means as shown in FIGURE 6, the cable being connected to the shaft so as to wind therearound, and activate the lever members as before described.

It is also noted that this mechanism may be incorporated in what are known as bucket seats as well as other automotive types or their equivalent for use in all seating applications.

I claim:

1. In seat construction of the class described, in combination, a frame including front and rear longitudinally extending members, spring means extending transversely between said members and connected thereto, tension instrumentalities supported beneath the spring means and connected to certain of said means, said instrumentalities including lever members having portions for co-action with the spring means to provide increased fore and aft support, said lever members being L-shaped and arranged in pairs for pivotal movement about the juncture of the arms and legs, operating parts including cable means connecting corresponding legs of each spaced pair of lever members, and means connected to said cable means to shorten the distance between the free ends of said legs.

2. In seat construction of the class described, in combination, a frame including front and rear longitudinally extending members, spring means extending transversely between said members and connected thereto, tension instrumentalities adjacent the spring means, means to adjust said instrumentalities to increase and decrease the support provided by the spring means, said spring means being flat, sinuous members arranged in a parallel series connected to the front and rear frame members, the tension instrumentalities comprising a series of pairs of lever members, each member including an arm and leg which diverge, the juncture of said arms and legs being connected to the spring members with the legs extending away from said connection, the free ends of each pair of legs being connected by the adjusting means for movement of said free ends toward and from one another.

3. In seat construction of the class described, in combination, a frame including front and rear longitudinally extending members, spring means extending transversely between said members and connected thereto, tension instrumentalities adjacent the spring means, means to adjust said instrumentalities to increase and decrease the support provided by the spring means, and a back arranged to extend from said seat frame first described, said back being of substantially identical construction including a frame and spring means, and having tension instrumentalities and adjustable means operable substantially identically and independently to change the support provided by the said spring means of said back.

4. The combination as claimed in claim 2, wherein the free ends of the legs of each pair of lever members are connected together by a cable extending therebetween, the cable is in turn connected to a winding shaft to draw said free ends together upon rotation of said shaft to wind the cable therearound, and means to turn said shaft.

5. The combination as claimed in claim 4, wherein the shaft may be rotated varying distances and itself is supported by the cables aforesaid.

6. The combination as claimed in claim 3, wherein the spring means of the back are flat, sinuous members connected to opposite members of the frame, the tension instrumentalities comprise lever members each having a diverging arm and leg element pivotally connected in pairs to certain of said members, the free ends of the legs of each pair of lever members are connected to a winding shaft which is rotatable to draw said leg free ends together whereby the arms are caused to exert an angular force on the springs to increase the resistance to deflection thereof.

7. A combination as claimed in claim 6, wherein the force on the springs is variable, means being provided to rotate the shaft in varying increments to effect such variation, and maintain such adjusted position.

References Cited

UNITED STATES PATENTS

| | | | |
|---|---|---|---|
| 2,550,831 | 5/1951 | Lingenfelter | 297—284 |
| 2,740,468 | 4/1956 | Gonia et al. | 267—89 |
| 2,763,338 | 9/1956 | Kime | 267—105 X |
| 2,893,475 | 7/1959 | Foldermaier | 267—89 |
| 3,052,459 | 9/1962 | Belsky | 267—89 |
| 3,095,188 | 6/1963 | Giese | 267—89 |
| 3,178,221 | 4/1965 | Schwartz | 297—284 |
| 3,241,879 | 3/1966 | Castello et al. | 297—284 |

CASMIR A. NUNBERG, *Primary Examiner.*